(12) United States Patent
Wu et al.

(10) Patent No.: US 10,436,493 B2
(45) Date of Patent: Oct. 8, 2019

(54) FREEZING TEMPERATURE CONTROLLABLE SPRAY FREEZING TOWER FOR PREPARING MICRON-SIZED SPHERICAL ICE PARTICLES

(71) Applicant: SOOCHOW UNIVERSITY, Suzhou (CN)

(72) Inventors: Duo Wu, Suzhou (CN); Shengyu Zhang, Suzhou (CN); Zhenkai Liao, Suzhou (CN); Zhangxiong Wu, Suzhou (CN); Jie Xiao, Suzhou (CN); Xiaodong Chen, Suzhou (CN)

(73) Assignee: SOOCHOW UNIVERSITY, Suzhou (CN)

(*) Notice: Subject to any disclaimer, the term of this patent is extended or adjusted under 35 U.S.C. 154(b) by 221 days.

(21) Appl. No.: 15/541,763

(22) PCT Filed: Aug. 29, 2016

(86) PCT No.: PCT/CN2016/097188
§ 371 (c)(1),
(2) Date: Jul. 6, 2017

(87) PCT Pub. No.: WO2017/152594
PCT Pub. Date: Sep. 14, 2017

(65) Prior Publication Data
US 2018/0120012 A1    May 3, 2018

(30) Foreign Application Priority Data
Mar. 9, 2016   (CN) .......................... 2016 1 0133187

(51) Int. Cl.
*F25C 1/12*   (2006.01)
*F25C 1/00*   (2006.01)
*B01J 2/04*   (2006.01)

(52) U.S. Cl.
CPC .................. *F25C 1/12* (2013.01); *B01J 2/04* (2013.01); *F25C 1/00* (2013.01)

(58) Field of Classification Search
CPC .................. B01J 2/02; F25C 1/00; F25C 1/12
See application file for complete search history.

(56) References Cited

U.S. PATENT DOCUMENTS 3,966,639 A * 6/1976 Callahan .................... B01J 2/02
                                                    502/215
4,704,873 A * 11/1987 Imaike ....................... A23L 3/36
                                                     62/538

(Continued)

FOREIGN PATENT DOCUMENTS

CN    105289401 A       2/2016
CN    105289410    *    2/2016

(Continued)

*Primary Examiner* — Henry T Crenshaw
(74) *Attorney, Agent, or Firm* — SZDC Law P.C.

(57) ABSTRACT

A freezing temperature controllable spray freezing tower for preparing micron-sized spherical ice particles includes a tower body, an atomization system, a material feeding system, a circulatory air supplying system, a refrigeration system and a tower wall cooling and thermal insulation system. An air storage cavity is formed at a top of the tower body, a freezing chamber is formed inside the tower body, a material collecting chamber is formed at a bottom of the tower body. The atomization system is in communication with the air storage cavity, the material feeding system is in communication with the atomization system, the circulatory air supplying system is in communication with the bottom of the freezing chamber and the refrigeration system respectively, the refrigeration system is connected to the air storage cavity and a tower wall of the tower body. Thus the operation is convenient and simple.

13 Claims, 2 Drawing Sheets

(56) References Cited

U.S. PATENT DOCUMENTS

| | | | | |
|---|---|---|---|---|
| 4,748,817 A | * | 6/1988 | Oura | F25C 1/00 |
| | | | | 406/152 |
| 4,869,090 A | * | 9/1989 | Tada | G11B 5/84 |
| | | | | 72/53 |
| 4,932,168 A | * | 6/1990 | Tada | B08B 7/0092 |
| | | | | 134/7 |
| 4,974,375 A | * | 12/1990 | Tada | B24C 1/003 |
| | | | | 261/124 |
| 5,216,890 A | * | 6/1993 | Ban | B01D 7/02 |
| | | | | 62/121 |
| 5,307,640 A | * | 5/1994 | Fawzy | A61K 9/1688 |
| | | | | 62/373 |
| 5,737,928 A | * | 4/1998 | Lee | F25C 1/00 |
| | | | | 62/347 |
| 5,891,212 A | * | 4/1999 | Tang | B01J 2/02 |
| | | | | 75/335 |
| 2011/0114745 A1 | | 5/2011 | Buisson et al. | |
| 2012/0036871 A1 | * | 2/2012 | Folger | B01J 2/02 |
| | | | | 62/66 |
| 2013/0305771 A1 | * | 11/2013 | Kim | F25D 23/068 |
| | | | | 62/344 |

FOREIGN PATENT DOCUMENTS

| | | |
|---|---|---|
| CN | 105597622 A | 5/2016 |
| CN | 101738063 A | 6/2016 |
| CN | 205599104 U | 9/2016 |
| DE | 19750679 B4 | 10/2004 |
| FR | 2929136 A1 | 10/2009 |

\* cited by examiner

FREEZING TEMPERATURE CONTROLLABLE SPRAY FREEZING TOWER FOR PREPARING MICRON-SIZED SPHERICAL ICE PARTICLES

This application is the national stage of International Application No. PCT/CN2016/097188, titled "FREEZING TEMPERATURE CONTROLLABLE SPRAY FREEZING TOWER FOR PREPARING MICRON-SIZED SPHERICAL ICE PARTICLES," filed on Aug. 29, 2016 which claims priority to Chinese Patent Application No. 201610133187.1, titled "FREEZING TEMPERATURE CONTROLLABLE SPRAY FREEZING TOWER FOR PREPARING MICRON-SIZED SPHERICAL ICE PARTICLES", filed with the Chinese State Intellectual Property Office on Mar. 9, 2016, the entire disclosures of which applications are incorporated herein by reference.

FIELD

The present application relates to a spray freezing device, and particularly to a freezing temperature controllable spray freezing tower for preparing micron-sized spherical ice particles.

BACKGROUND

Currently, material drying can be classified into spray drying and freeze drying. The conventional spray drying cannot dry thermosensitive materials, thus, its application fields are limited. Freeze drying has disadvantages of a long drying time and a high cost.

In view of the technical deficiencies in the above material drying manners, spray freeze drying is researched and developed. The spray freeze drying is a new particle preparation technology in recent years which combines spray drying with freeze drying, and has been successfully applied in protein aspect as well as inhalable medicine and high value-added food industries.

The process of spray freeze drying includes three stages, i.e., atomizing, freezing and drying. Specifically, in the process of drying, firstly the material is atomized into fine liquid droplets by an atomizer, and then contacts with a refrigeration medium to be frozen, and finally, is performed with vacuum freeze drying or fluidized bed drying.

However, in the process of the conventional spray freeze drying, bumping phenomenon may occur when liquid droplets contact with a refrigeration medium. In addition, disadvantages such as waste caused by volatilization of the refrigeration medium with a low boiling point and uncontrollable temperature of the refrigeration medium are also presented, which has an adverse effect on the shape, appearance and performance of the particles and the development of resource saving strategy in China.

Therefore, it is necessary to put forward a further technical solution aimed at the above issues.

SUMMARY

In view of this, a freezing temperature controllable spray freezing tower for preparing micron-sized spherical ice particles is provided according to the present application, to overcome the deficiencies in the conventional technology.

For achieving the above object, the technical solutions according to embodiments of the present application are as follows.

A freezing temperature controllable spray freezing tower for preparing micron-sized spherical ice particles includes a tower body, an atomization system, a material feeding system, a circulatory air supplying system, a refrigeration system and a tower wall cooling and thermal insulation system;

an air storage cavity is formed at a top of the tower body, a freezing chamber is formed inside the tower body, a material collecting chamber is formed at a bottom of the tower body, and the air storage cavity, the freezing chamber and the material collecting chamber are in communication with one another, and the atomization system is in communication with the air storage cavity, the material feeding system is in communication with the atomization system via a material feeding pipe, the circulatory air supplying system is in communication with the bottom of the freezing chamber and the refrigeration system respectively via a circulating air return pipe and an air pipe, the refrigeration system is connected to the air storage cavity and a tower wall of the tower body, the tower wall cooling and thermal insulation system is wrapped around the tower wall.

As an improvement to the freezing temperature controllable spray freezing tower for preparing micron-sized spherical ice particles according to the present application, the tower body includes several tower cylinders arranged to be stacked and dismountably built to form the tower body.

As an improvement to the freezing temperature controllable spray freezing tower for preparing micron-sized spherical ice particles according to the present application, the number of the tower cylinders is four, and any one of the tower cylinders has an inner diameter of 360 mm, an outer diameter of 660 mm and a height of 400 mm.

As an improvement to the freezing temperature controllable spray freezing tower for preparing micron-sized spherical ice particles according to the present application, a plurality of holes are provided in the bottom of the air storage cavity, and the air storage cavity is in communication with the freezing chamber via the plurality of holes.

As an improvement to the freezing temperature controllable spray freezing tower for preparing micron-sized spherical ice particles according to the present application, the atomization system includes an atomizer, an atomizing air pipe and a rotor flow meter; and the atomizer has an inlet in communication with the material feeding system and an outlet located in the air storage cavity, the rotor flow meter is arranged on the atomizing air pipe, and the atomizing air pipe extends through the refrigeration system to be connected to the atomizer, and the outlet of the atomizer is arranged to face towards the freezing chamber.

As an improvement to the freezing temperature controllable spray freezing tower for preparing micron-sized spherical ice particles according to the present application, a check valve and a dehumidifier are provided at an inlet of the atomizing air pipe.

As an improvement to the freezing temperature controllable spray freezing tower for preparing micron-sized spherical ice particles according to the present application, the material feeding system includes a pressure regulating valve, a pressure gauge, a material tank and a filter; and the pressure regulating valve and the pressure gauge are arranged on a material tank compressed air inlet pipe connected to an inlet of the material tank, an outlet of the material tank is in communication with the atomization system via the material feeding pipe, and the filter is arranged on the material feeding pipe.

As an improvement to the freezing temperature controllable spray freezing tower for preparing micron-sized spherical ice particles according to the present application, the circulatory air supplying system includes a fan, a frequency converter and a controller; and the fan has an inlet in communication with the material collecting chamber via the circulating air return pipe and an outlet in communication with the refrigeration system via the air pipe, the frequency converter is arranged on a pipeline between the circulating air return pipe and the air pipe, and the controller is arranged on the air pipe.

As an improvement to the freezing temperature controllable spray freezing tower for preparing micron-sized spherical ice particles according to the present application, the circulatory air supplying system further includes an air volume regulating valve and a flow rate measuring device, the air volume regulating valve is arranged on the pipeline between the circulating air return pipe and the air pipe and the flow rate measuring device is arranged on the air pipe.

As an improvement to the freezing temperature controllable spray freezing tower for preparing micron-sized spherical ice particles according to the present application, the refrigeration system includes a thermocouple, a cold air liquid thermostatic bath, a tower wall liquid thermostatic bath, a heat exchanger, a refrigeration unit and a thermostat;

the thermostat is plural in number, and the plurality of thermocouples are arranged in the freezing chamber and the refrigeration system;

the thermostat, the refrigeration unit, the cold air liquid thermostatic bath, the heat exchanger and the thermocouples are connected in series in the listed sequence to form a first closed-loop control system, in the first closed-loop control system, the cold air liquid thermostatic bath is in communication with the heat exchanger via an inlet pipe of the cold air liquid thermostatic bath and an outlet pipe of the cold air liquid thermostatic bath, the heat exchanger is in communication with the air storage cavity via a circulating air inlet pipe; and the thermostat, the refrigeration unit, the tower wall liquid thermostatic bath and the thermocouples are connected in series in the listed sequence, to form a second closed-loop control system, in the second closed-loop control system, the tower wall liquid thermostatic bath is in communication with the tower wall cooling and thermal insulation system via an inlet pipe of the tower wall liquid thermostatic bath and an outlet pipe of the tower wall liquid thermostatic bath.

As an improvement to the freezing temperature controllable spray freezing tower for preparing micron-sized spherical ice particles according to the present application, the spray freezing tower further includes a display device, and the plurality of thermocouples are connected to the display device.

As an improvement to the freezing temperature controllable spray freezing tower for preparing micron-sized spherical ice particles according to the present application, a pressure measuring device and a pressure relief valve are arranged inside the tower body on the tower wall, the pressure measuring device is connected to the display device, the pressure relief valve has a preset pressure value, and in the case that the pressure inside the tower body is equal to the preset pressure value, the pressure relief valve relieves pressure automatically.

As an improvement to the freezing temperature controllable spray freezing tower for preparing micron-sized spherical ice particles according to the present application, the tower wall cooling and thermal insulation system includes a heat exchanging coil and a thermal insulation material; and the heat exchanging coil is wound around the tower wall of the tower body, the thermal insulation material is wrapped on the heat exchanging coil, and the heat exchanging coil is in communication with the refrigeration system.

Compared with the conventional technology, the beneficial effects of the present application are as follows. In the freezing temperature controllable spray freezing tower for preparing micron-sized spherical ice particles according to the present application, the circulatory air supplying system, the refrigeration system, the tower wall cooling and thermal insulation system, the material feeding system, and the atomization system can all be controlled automatically, thus the operation is convenient and simple.

In addition, the freezing temperature controllable spray freezing tower for preparing micron-sized spherical ice particles according to the present application can be controlled accurately, and the apparatus can be controlled to manufacture ice spheres under different temperatures, which reduces the consumption of coolant, and avoids occurrence of liquid droplets bumping, thus having a significant meaning in developing the spray freeze drying, and being applicable to research and development in laboratories and factories and has a wide application.

BRIEF DESCRIPTION OF THE DRAWINGS

For more clearly illustrating the technical solutions in the embodiments of the present application or the conventional technology, drawings referred to describe the embodiments or the conventional technology will be briefly described hereinafter. Apparently, the drawings in the following description are only several embodiments of the present application, and for the person skilled in the art, other drawings may be obtained based on these drawings without any creative efforts.

DETAILED DESCRIPTION

For enabling those skilled in the art to better understand the technical solutions in the present application, the technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

Figure 1:
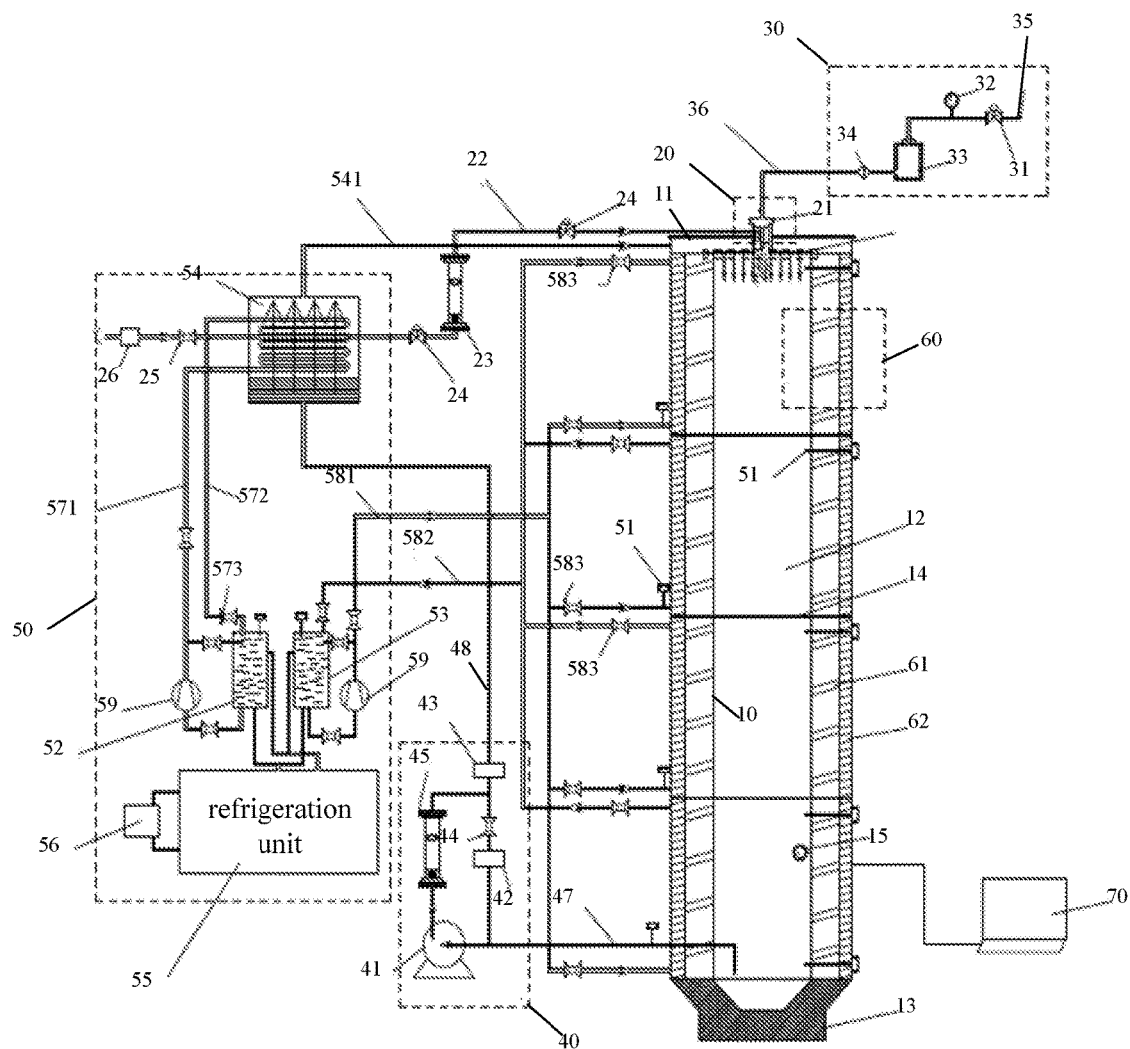
FIG. 1 is a plane view showing the structure of a freezing temperature controllable spray freezing tower for preparing micron-sized spherical ice particles according to the present application.

FIG. 1 is a plane view showing the structure of a freezing temperature controllable spray freezing tower for preparing micron-sized spherical ice particles according to the present application.

As shown in FIG. 1, the freezing temperature controllable spray freezing tower for preparing micron-sized spherical ice particles includes a tower body 10, an atomization system 20, a material feeding system 30, a circulatory air supplying system 40, a refrigeration system 50, a tower wall cooling and thermal insulation system 60 and a display device 70.

An air storage cavity 11 is formed at the top of the tower body 10, a freezing chamber 12 is formed inside the tower body 10, and a material collecting chamber 13 is formed at the bottom of the tower body 10. The air storage cavity 11, the freezing chamber 12 and the material collecting chamber 13 are in communication with one another.

Figure 2:
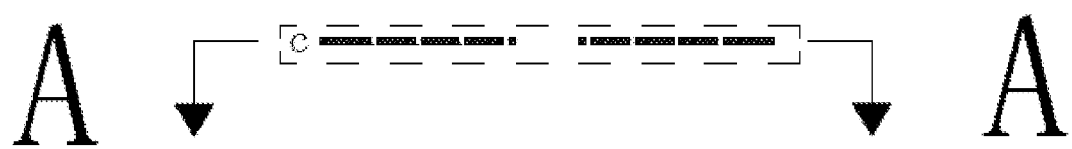
FIG. 2 is an enlarged schematic view showing an air distributor in FIG. 1.
Figure 3:
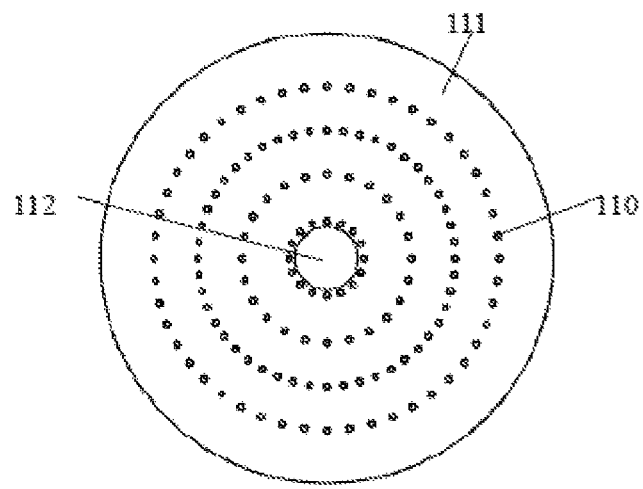
FIG. 3 is an enlarged schematic view of FIG. 2 in the direction A-A.

Referring to FIGS. 2 and 3, specifically, cold air entering the freezing chamber 12 first enters the air storage cavity 11, a plurality of holes 110 are provided in the bottom of the air storage cavity 11, and the air storage cavity is in communication with the freezing chamber 12 via the plurality of holes 110. The plurality of holes 110 are uniformly distributed in the bottom of the air storage cavity 11, thus an air distributor 111 is formed at the bottom of the air storage cavity 11. The air distributor 111 is preferably circular shaped, in this case, a through hole 112 is provided at a circle center position of the air distributor 111, and the plurality of holes 110 are uniformly distributed around the through hole 112. The through hole 112 is configured to place an atomizer 21.

The freezing chamber 12 is configured to freeze a liquid material entering therein to freeze it into solid spherical particles. The freezing chamber 12 is specifically defined by an internal space of the tower body 10. The tower body 10 includes a plurality of tower cylinders 14, which are arranged to be stacked and are detachablely built to form the tower body 10. Therefore, the tower body has advantages of convenient mounting and dismounting. Preferably, the number of the tower cylinders 14 is four, and any one of the tower cylinders has an inner diameter of 360 mm, an outer diameter of 660 mm and a height of 400 mm.

The material collecting chamber 13 is configured to collect solid spherical particles formed by freezing. The material collecting chamber 13 is located at the bottom of the tower body 10, and is in communication with the freezing chamber 12. Thus, after the liquid material is frozen into solid spherical particles, the solid particles, under the action of gravity, directly fall into the material collecting chamber 13 to be collected.

The atomization system 20 is configured to atomize the fed material to make the material formed into fine liquid droplets, thereby facilitating the performing of the subsequent freezing. Specifically, the atomization system 20 is in communication with the air storage cavity 11, the atomization system 20 includes the atomizer 21, an atomizing air pipe 22, and a rotor flow meter 23.

The atomizer 21 has an inlet in communication with the material feeding system 30, and has an outlet located in the air storage cavity and arranged to face the freezing chamber 12. Thus, the material entering via the material feeding system 30 is formed into fine liquid droplets under the action of the atomizer 21. The rotor flow meter 23 is arranged on the atomizing air pipe 22, and is configured to control a flow rate of the gas inside the atomizing air pipe 22. Moreover, regulating valves 24 are further provided on the atomizing air pipe 22, and are located at two sides of the rotor flow meter 23.

The atomizing air pipe 22 extends through the refrigeration system 50 to be connected to the atomizer 21. Thus, while atomizing air is provided to the atomizer 21 via the atomizing air pipe 22, the atomizing air is cooled by the refrigeration system 50 first, and thus, the atomizing air entering the air storage cavity 11 has a temperature equivalent to the temperature in the freezing chamber 12. Further, in the present application, the atomizer 21 employs a fluid nozzle, thus, after entering the atomizer 21, the atomizing air disperses the liquid material passing through a material feeding pipe 36 and the atomizer 21 and thus fine liquid droplets are formed. In addition, at an inlet of the atomizing air pipe 22, a check valve 25 and a dehumidifier 26 are further provided. The atomizing air is dehumidified by the dehumidifier 26 and then enters the atomizer 21.

The material feeding system 30 is configured to feed material, and is in communication with the atomization system 20 via the material feeding pipe 36. To achieve the above object, the liquid material provided by the material feeding system 30 is atomized in the atomization system 20. Specifically, the material feeding system 30 includes a pressure regulating valve 31, a pressure gauge 32, a material tank 33 and a filter 34.

The pressure regulating valve 31 and the pressure gauge 32 are arranged on a material tank compressed air inlet pipe 35 connected to an inlet of the material tank 33. Thus, the pressure of a compressed air inside the material tank compressed air inlet pipe 35 can be regulated by the pressure regulating valve 31, and the pressure of the compressed air inside the material tank compressed air inlet pipe 35 may be read by the pressure gauge 32. An outlet of the material tank 33 is in communication with the atomization system 20 via the material feeding pipe 36, and the filter 34 is arranged on the material feeding pipe 36. Thus, the liquid material entering the atomization system 20 can be filtered by the filter 34 first.

The circulatory air supplying system 40 is used for circulatory supply and utilization of cold air in the freezing chamber 12. For achieving the above object, the circulatory air supplying system 40 is in communication with the bottom of the freezing chamber 12 and the refrigeration system 50 respectively via a circulating air return pipe 47 and an air pipe 48. Specifically, the circulatory air supplying system 40 includes a fan 41, a frequency converter 42 and a controller 43.

An inlet of the fan 41 is in communication with the bottom of the freezing chamber 12 via the circulating air return pipe 47, thus the cold air reaching the bottom of the freezing chamber 12 is re-pumped into the fan to be recycled. Besides, an outlet of the fan 41 is in communication with the refrigeration system 50 via the air pipe 48. The frequency converter 42 is arranged on a pipeline between the circulating air return pipe 47 and the air pipe 48, and the controller 43 is arranged on the air pipe 48.

In addition, the circulatory air supplying system 40 further includes an air volume regulating valve 44, a flow rate measuring device 45 and a pressure gauge 48. The air volume regulating valve 44 is arranged on the pipeline between the circulating air return pipe 47 and the air pipe 48, the flow rate measuring device 45 is arranged on the air pipe 48, and the pressure gauge 48 is installed inside the freezing chamber 12.

A pressure measuring device 15 and a pressure relief valve are provided inside the tower body 10, with the pressure measuring device 15 being connected to the display device 70, thus, the pressure measuring device 15 monitors the variation of pressure inside the tower in real time, and a pressure value is displayed on the display device 70, and the airtightness is ensured. Preferably, the pressure measuring device 15 is a pressure gauge. The pressure relief valve has a preset pressure value, and in the case that the pressure inside the tower is equal to the preset pressure value, the pressure relief valve relieves pressure automatically.

When the circulatory air supplying system 40 works, by presetting a preset flow rate, the controller 43 processes the flow rate signal into a corresponding numerical signal and transmits it to the air volume regulating valve 44, and the air volume regulating valve 44 transmits the numerical signal to the frequency converter 42, and the frequency converter 42 further converts the numerical signal into a frequency signal and sends it to the fan 41, the fan 41 pumps air with this flow rate to the refrigeration system 50 according to the frequency signal. The flow rate measuring device 45 detects a flow rate at the outlet of the fan 41 and feeds back the signal to the controller 43, to regulate the air flow rate to the preset flow rate.

The refrigeration system 50 is configured to cool the atomizing air and the air pumped by the circulatory air supplying system 40. Furthermore, the cooling system 50 is further configured to supply a coolant to the tower wall cooling and thermal insulation system 60. For achieving the above abject, the refrigeration system 50 is connected to the air storage cavity and a tower wall of the tower body 10, and the tower wall cooling and thermal insulation system 60 is wrapped around the tower wall. Specifically, the refrigeration system 50 includes a thermocouple 51, a cooling air liquid thermostatic bath 52, a tower wall liquid thermostatic bath 53, a heat exchanger 54, a refrigeration unit 55 and a thermostat 56.

A plurality of thermocouples 51 are provided, and the plurality of thermocouples 51 are arranged inside the freezing chamber 12 and the refrigeration system 50. Thus, the plurality of thermocouples 51 distributed inside the freezing chamber 12 may detect temperature values where the thermocouples 51 are located respectively. Furthermore, the plurality of thermocouples 51 are connected to the display device 70, and thus, the display device 70 can display corresponding temperature values in real time.

The thermostat 56, the refrigeration unit 55, the cold air liquid thermostatic bath 52, the heat exchanger 54 and a thermocouple 51 are connected in series in the listed sequence to form a first closed-loop control system. The first closed-loop control system can achieve cooling of the air pumped by the circulatory air supplying system 40. In the first closed-loop control system, the cold air liquid thermostatic bath 52 is in communication with the heat exchanger 54 via an inlet pipe 571 of the cold air liquid thermostatic bath and an outlet pipe 572 of the cold air liquid thermostatic bath, and the heat exchanger 54 is in communication with the air storage cavity 11 via a circulating air inlet pipe 541. In addition, a cryopump 59 is further provided between the cold air liquid thermostatic bath 52 and the heat exchanger 54, and the outlet pipe 572 of the cold air liquid thermostatic bath is further provided with a check valve 573.

Accordingly, when the first closed-loop control system works, the thermostat 56 enables the cold air temperature to be adjustable within a range from the room temperature to 80 Celsius degrees below zero by presetting a circulating cold air temperature. The thermostat 56 converts a numerical signal into a corresponding signal and transmits it to the refrigeration unit 55, and the refrigeration unit 55 works to refrigerate cyclically. Coolant is contained in the cold air liquid thermostatic bath 52, and enters the heat exchanger 54 via the inlet pipe 571 of the cold air liquid thermostatic bath to exchange heat with the gas discharged from an outlet pipe of the circulatory air supplying system. Further, the coolant is discharged via the outlet pipe 572 of the cold air liquid thermostatic bath to enter the cold air liquid thermostatic bath 52 to circulate again.

Further, the thermocouple 51 detects an air inlet temperature at an air inlet at the top of the freezing chamber 12, and feedbacks the signal to the thermostat 56, and the thermostat 56 compares a preset temperature with the air inlet temperature. In the case that the preset temperature is lower than the air inlet temperature, the refrigeration unit 55 continue to work to cool the coolant; and in the case that the preset temperature is higher than the air inlet temperature, the refrigeration unit 55 stops working, thus achieving a closed-loop control.

The thermostat 56, the refrigeration unit 55, the tower wall liquid thermostatic bath 53 and the thermocouple 51 are connected in series in the listed sequence to form a second closed-loop control system. In the second closed-loop control system, the tower wall liquid thermostatic bath 53 is in communication with the tower wall cooling and thermal insulation system 60 via an inlet pipe 581 of the tower wall liquid thermostatic bath and an outlet pipe 582 of the tower wall liquid thermostatic bath. In addition, a cryopump 59 is further provided between the tower wall liquid thermostatic bath 53 and the tower wall cooling and thermal insulation system 60, and the inlet pipe 581 of the tower wall liquid thermostatic bath is further provided with the thermocouple 51. Moreover, check valves 583 are distributed on the inlet pipe 581 of the tower wall liquid thermostatic bath and the outlet pipe 582 of the tower wall liquid thermostatic bath.

Accordingly, when the second closed-loop control system works, the thermostat 56 enables the tower wall temperature to be adjustable within the range from a room temperature to 80 Celsius degrees below zero by presetting a tower wall temperature. The thermostat 56 converts a numerical signal into a corresponding signal and transmits it to the refrigeration unit 55, and the refrigeration unit 55 works to refrigerate cyclically. Coolant is contained in the tower wall liquid thermostatic bath 53, and enters the tower wall cooling and thermal insulation system via the inlet pipe 581 of the tower wall liquid thermostatic bath. Further, the coolant is discharged via the outlet pipe 582 of the tower wall liquid thermostatic bath to enter the cold air liquid thermostatic bath 52 to circulate again.

Further, the thermocouple 51 detects the temperature of the tower wall of the freezing chamber, and feedbacks the signal to the thermostat 56, and the thermostat 56 compares a preset temperature with the tower wall temperature. In the case that the preset temperature is lower than the tower wall temperature, the refrigeration unit 55 continues to work to cool the coolant; and in the case that the preset temperature is higher than the tower wall temperature, the refrigeration unit 55 stops working, thus achieving a closed-loop control.

The tower wall cooling and thermal insulation system 60 is configured to maintain a temperature condition inside the freezing chamber 12. Specifically, the tower wall cooling and thermal insulation system 60 includes a heat exchanging coil 61 and a thermal insulation material 62.

The heat exchanging coil 61 is wound around the tower wall of the tower body 10, and the coolant flowing through the tower wall liquid thermostatic bath 23 is inputted via an inlet end of the heat exchanging coil 61, and flows out from an outlet end. Thus, the refrigeration system 50 provides the coolant to the tower wall cooling and thermal insulation system 60. The thermal insulation material is wrapped on the heat exchanging coil, therefore, by the collaborative action of the heat exchanging coil 61 and the thermal insulation material 62, a cold environment inside the freezing chamber 12 is created. In this case, an outer diameter of the entire tower body 10 is 660 mm.

Thus, the freezing temperature controllable spray freezing tower for preparing micron-sized spherical ice particles according to the present application performs spraying and freezing of the liquid material according to the following steps of S1 to S4.

In step S1, a material tank cover at the top of the material tank is opened, an experimental liquid material is poured into the material tank, and then the material tank cover is fixed to the material tank hermetically, a compressed air valve is opened to regulate a pressure parameter inside the material tank compressed air inlet pipe to be in conformity with the material, and the liquid material may enter the atomizer via the material feeding pipe.

In step S2, an air flow parameter in conformity with the material is set in the controller of the circulatory air supplying system, and at the same time, the controller, the frequency converter and the fan are turned on, to wait for the flow rate of the air inside the closed circulating air system to be stable.

In step S3, a cold air temperature and a tower wall temperature are respectively set in the thermostat of the refrigeration system, the cold air temperature and the tower wall temperature are set to be adapted to the air flow rate respectively, the refrigeration system is started, and under the action of the closed-loop control of the thermostat, the refrigeration unit, the cold air liquid thermostatic bath, the thermocouple, the heat exchanger and the thermocouples, the heat exchanger inputs a cold air with a preset temperature to the air storage cavity; and under the action of the closed-loop control of the thermostat, the refrigeration unit, the tower wall liquid thermostatic bath and the thermocouples, the tower wall liquid thermostatic bath transmits alcohol having a set temperature to the tower wall coil, to allow the tower wall to reach the set temperature.

In Step S4, the atomizing air pipe is opened, the rotor flow meter is controlled to regulate the flow parameter of the compressed air inside the atomizing air pipe to be in conformity with the material.

In Step S5, after the liquid material passing through the atomizer is dispersed into fine liquid droplets, the material falls into the freezing chamber and finally falls onto the bottom of the freezing chamber to be collected.

In summary, in the freezing temperature controllable spray freezing tower for preparing micron-sized spherical ice particles according to the present application, the circulatory air supplying system, the refrigeration system, the tower wall cooling and thermal insulation system, the material feeding system and the atomization system can all be controlled automatically, thus the operation is convenient and simple.

In addition, the freezing temperature controllable spray freezing tower for preparing micron-sized spherical ice particles according to the present application can control accurately, and the apparatus can be controlled to manufacture ice spheres under different temperatures, which may reduce the consumption of coolant, and avoid occurrence of liquid droplets bumping, thus having a significant meaning in developing the spray freeze drying, and being applicable to research and development in laboratories and factories, and has a wide application.

For those skilled in the art, obviously, the present application is not limited to the details of the above exemplary embodiments, and can be implemented in other specific forms without departing from the spirit or basic features of the present application. Therefore, viewed from whichever point, the embodiments should be regarded as being illustrative rather than being limitative, the scope of the present application is defined by the appended claims rather than by the description, therefore, all the variations fall into the denotation and scope of equivalent essentials of claims are intended to be covered in the present application. Any reference numerals in claims should not be regarded as a limit to the claims related.

In addition, it should be appreciated that, though the present application is described according to the embodiments, it doesn't mean that each embodiment only include one independent technical solution, such a narration way is simply for the purpose of clarity, those skilled in the art should take the description integrally, the technical solutions in the embodiments may also be combined appropriately, to form other embodiments understandable for those skilled in the art.

What is claimed is:

1. A freezing temperature controllable spray freezing tower for preparing micron-sized spherical ice particles, comprising:
   a tower body,
   an atomization system,
   a material feeding system,
   a circulatory air supplying system,
   a refrigeration system, and
   a tower wall cooling and thermal insulation system, wherein
   an air storage cavity is formed at a top portion of the tower body, a freezing chamber is formed inside the tower body, a material collecting chamber is formed at the bottom of the tower body, and the air storage cavity, the freezing chamber and the material collecting chamber are in communication with one another; and
   the atomization system is in communication with the air storage cavity, the material feeding system is in communication with the atomization system via a material feeding pipe, the circulatory air supplying system is in communication with the bottom of the freezing chamber and the refrigeration system respectively via a circulating air return pipe and an air pipe, the refrigeration system is connected to the air storage cavity and a tower wall of the tower body, and the tower wall cooling and thermal insulation system is wrapped around the tower wall.

2. The freezing temperature controllable spray freezing tower for preparing micron-sized spherical ice particles according to claim 1, wherein the tower body comprises a plurality of tower cylinders arranged to be stacked and detachably built to form the tower body.

3. The freezing temperature controllable spray freezing tower for preparing micron-sized spherical ice particles according to claim 2, wherein the number of the tower cylinders is four, and each one of the tower cylinders has an inner diameter of 360 mm, an outer diameter of 660 mm and a height of 400 mm.

4. The freezing temperature controllable spray freezing tower for preparing micron-sized spherical ice particles according to claim 1, wherein a plurality of holes are provided in the bottom of the air storage cavity, and the air storage cavity is in communication with the freezing chamber via the plurality of holes.

5. The freezing temperature controllable spray freezing tower for preparing micron-sized spherical ice particles according to claim 1, wherein the atomization system comprises an atomizer, an atomizing air pipe and a rotor flow meter; and
   the atomizer has an inlet in communication with the material feeding system and an outlet located in the air storage cavity, the rotor flow meter is arranged on the atomizing air pipe, and the atomizing air pipe extends through the refrigeration system to be connected to the atomizer, and the outlet of the atomizer is arranged to face towards the freezing chamber.

6. The freezing temperature controllable spray freezing tower for preparing micron-sized spherical ice particles according to claim 5, wherein a check valve and a dehumidifier are provided at an inlet of the atomizing air pipe.

7. The freezing temperature controllable spray freezing tower for preparing micron-sized spherical ice particles according to claim 1, wherein the material feeding system comprises a pressure regulating valve, a pressure gauge, a material tank and a filter; and the pressure regulating valve and the pressure gauge are arranged on a material tank compressed air inlet pipe connected to an inlet of the material tank, an outlet of the material tank is in communication with the atomization system via the material feeding pipe, and the filter is arranged on the material feeding pipe.

8. The freezing temperature controllable spray freezing tower for preparing micron-sized spherical ice particles according to claim 1, wherein the circulatory air supplying system comprises a fan, a frequency converter and a controller; and the fan has an inlet in communication with the material collecting chamber via the circulating air return pipe and an outlet in communication with the refrigeration system via the air pipe, the frequency converter is arranged on a pipeline between the circulating air return pipe and the air pipe, and the controller is arranged on the air pipe.

9. The freezing temperature controllable spray freezing tower for preparing micron-sized spherical ice particles according to claim 8, wherein the circulatory air supplying system further comprises an air volume regulating valve and a flow rate measuring device, the air volume regulating valve is arranged on a pipeline between the circulating air return pipe and the air pipe, and the flow rate measuring device is arranged on the air pipe.

10. The freezing temperature controllable spray freezing tower for preparing micron-sized spherical ice particles according to claim 1, wherein the refrigeration system comprises a thermocouple, a cold air liquid thermostatic bath, a tower wall liquid thermostatic bath, a heat exchanger, a refrigeration unit and a thermostat;

a plurality of thermocouples are provided, and the plurality of thermocouples are arranged in the freezing chamber and the refrigeration system;

the thermostat, the refrigeration unit, the cold air liquid thermostatic bath, the heat exchanger and the thermocouples are connected in series in the listed sequence to form a first closed-loop control system, in the first closed-loop control system, the cold air liquid thermostatic bath is in communication with the heat exchanger via an inlet pipe of the cold air liquid thermostatic bath and an outlet pipe of the cold air liquid thermostatic bath, the heat exchanger is in communication with the air storage cavity via a circulating air inlet pipe; and the thermostat, the refrigeration unit, the tower wall liquid thermostatic bath and the thermocouples are connected in series in the listed sequence, to form a second closed-loop control system, in the second closed-loop control system, the tower wall liquid thermostatic bath is in communication with the tower wall cooling and thermal insulation system via an inlet pipe of the tower wall liquid thermostatic bath and an outlet pipe of the tower wall liquid thermostatic bath.

11. The freezing temperature controllable spray freezing tower for preparing micron-sized spherical ice particles according to claim 10, further comprising a display device, wherein the plurality of thermocouples are connected to the display device.

12. The freezing temperature controllable spray freezing tower for preparing micron-sized spherical ice particles according to claim 11, wherein a pressure measuring device and a pressure relief valve are arranged inside the tower body on the tower wall, the pressure measuring device is connected to the display device, the pressure relief valve has a preset pressure value, and in the case that the pressure inside the tower body is equal to the preset pressure value, the pressure relief valve relieves pressure automatically.

13. The freezing temperature controllable spray freezing tower for preparing micron-sized spherical ice particles according to claim 1, wherein the tower wall cooling and thermal insulation system comprises a heat exchanging coil and a thermal insulation material; and the heat exchanging coil is wound around the tower wall of the tower body, the thermal insulation material is wrapped on the heat exchanging coil, and the heat exchanging coil is in communication with the refrigeration system.

* * * * *